Sept. 29, 1964

B. J. NIGRELLI ETAL 3,150,760

CONVEYOR MECHANISM FOR SEPARATING A SINGLE
ROW OF ARTICLES INTO TWO ROWS

Filed Feb. 21, 1962

INVENTORS
BIAGIO J. NIGRELLI
WENDELL E. STANDLEY
RICHARD B. WITTMANN

BY E. A. Wagonseller
ATTORNEY

Sept. 29, 1964 B. J. NIGRELLI ETAL 3,150,760
CONVEYOR MECHANISM FOR SEPARATING A SINGLE
ROW OF ARTICLES INTO TWO ROWS
Filed Feb. 21, 1962 3 Sheets-Sheet 2

INVENTORS
BIAGIO J. NIGRELLI
WENDELL E. STANDLEY
RICHARD B. WITTMANN
BY E. A. Wagonseller
ATTORNEY INVENTORS
BIAGIO J. NIGRELLI
WENDELL E. STANDLEY
RICHARD B. WITTMANN
BY E. A. Wagonseller
ATTORNEY 3,150,760
CONVEYOR MECHANISM FOR SEPARATING A SINGLE ROW OF ARTICLES INTO TWO ROWS
Biagio J. Nigrelli, Northbrook, Wendell E. Standley, Lake Forest, and Richard B. Wittmann, Chicago, Ill., assignors, by mesne assignments, to Johns-Nigrelli-Johns, Inc., Skokie, Ill., a corporation of Illinois
Filed Feb. 21, 1962, Ser. No. 174,731
5 Claims. (Cl. 198—31)

The present invention relates to conveying mechanism and more particularly to mechanism for separating a row of conveyed articles into two rows.

An important object of the invention is to provide a simple and economical arrangement of conveying members whereby selected articles of generally rectangular shape in a conveyed row can be engaged on opposite sides and advanced along a predetermined path of travel while other articles not so engaged may be advanced along a different path.

A further object of the invention is to provide means for the separation of a single conveyed row of articles, such as open end packages of cans and bottles, into two rows by employing downwardly extending conveyor elements to engage within the bights or spaces at the ends of a can package between the exposed surfaces of cans that are placed side by side in the package.

Other and more specific objects and advantages of the present invention will become apparent as the description proceeds.

In the drawings:

FIG. 4 is a vertical sectional view on an enlarged scale, taken along line 4—4 of FIG. 2, looking in the direction of the arrows;

FIG. 5 is a fragmentary horizontal sectional view taken along line 5—5 of FIG. 4 showing a can package immediately after it has been engaged by the engaging pins on the overhead conveyor members;

Figure 1:
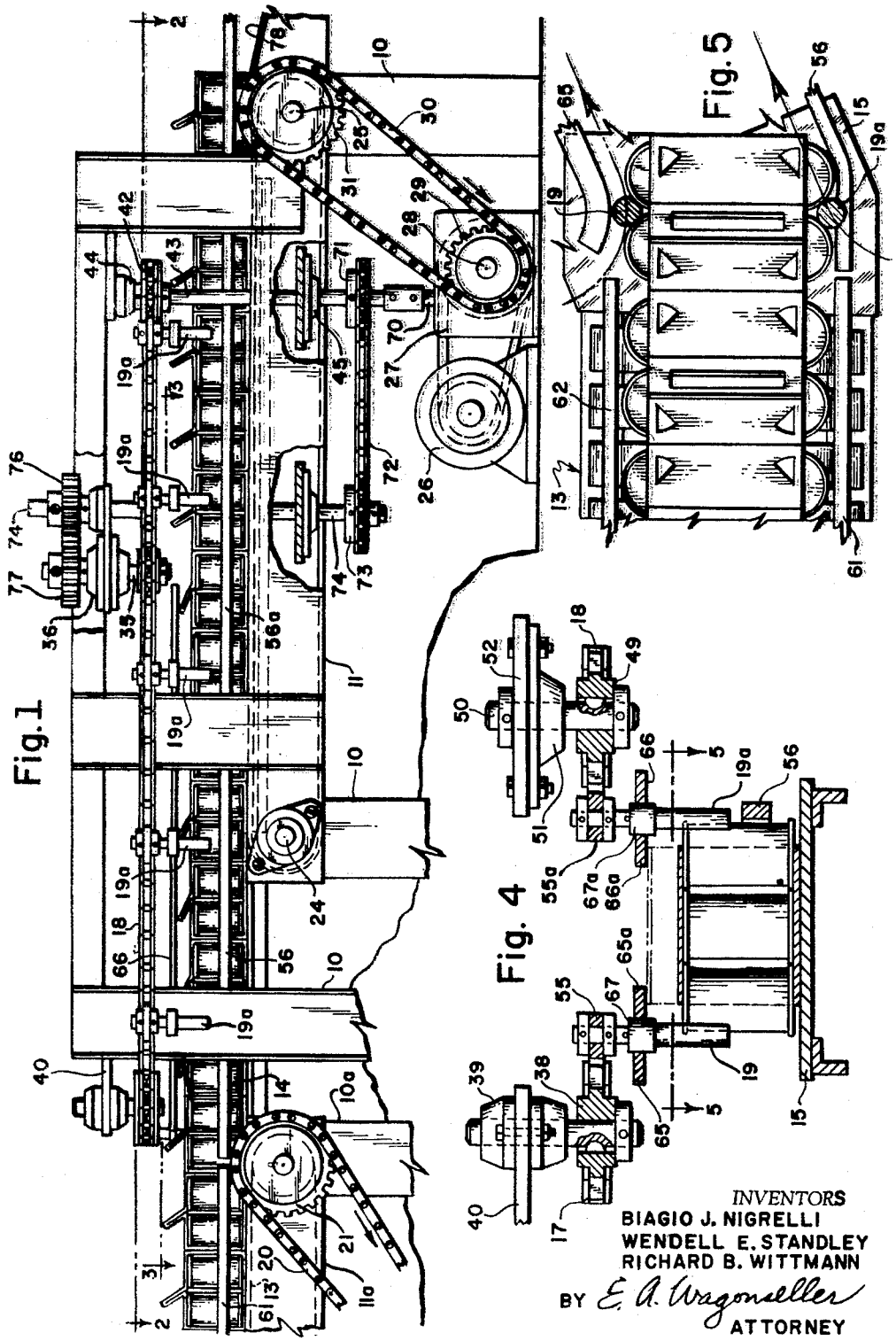
FIG. 1 is a side elevation of a machine constructed in accordance with the present invention.

The embodiment of the invention as herein disclosed is particularly adapted for handling packages of canned food or beverages in a situation where speed of the production line is in excess of the speed at which the packages can be subsequently handled by a single machine as, for example, a machine to load the packages into shipping trays or containers. By dividing the single line of packages into two or more lines they can be subsequently handled by a plurality of packing or other treating units.

Packages of cans, such as so-called "six packs," preferably enclosed in open-end wrapper type cartons are carried on a suitable delivery conveyor in abutted relation with the open ends of the packages disposed laterally of the path of travel. The packages are moved from a single line conveyor to a receiving conveyor having a width to accommodate two conveyed rows side by side. The transfer from the single line to the double line is effected by a pair of endless conveyor members located above the delivery and receiving conveyors. These conveyor members have sections extending parallel to each other and obliquely to the receiving conveyor. Pins extending downward from the endless conveyor members engage the cans at opposite open ends of alternate packages and advance such packages obliquely across the receiving conveyor, where they are released from the pins and thereafter travel in a straight line along one side of the conveyor. The remaining packages, not engaged by the pins, are not carried across the receiving conveyor and thus separate from the engaged packages and move in a straight line along the other side of the receiving conveyor and parallel with the other line of packages after their release from the pins.

Referring particularly to the drawings, the mechanism is supported on suitable upright and horizontal frame members 10, 10, 11, 11, and 12, 12. A delivery conveyor 13 is arranged to convey a single line of abutted can packages 14, 14 across a dead plate 15 and onto a wide receiving conveyor 16. A pair of conveyor chains 17 and 18, having suitable package engaging elements, herein shown as pins 19, 19a, engage each alternate package and carry such alternate packages obliquely across conveyor 16 where they are released to move thereafter in a straight line. The non-engaged packages are controlled by guides and are advanced on the conveyor 16 in a row parallel to the other line of packages.

The mechanism illustrated may be utilized with various well known forms of packages, with or without open ends, but it is best adapted for use with open-end can packages holding two rows of cans and in which the two end cans of the row are exposed at each end of the package. In the present instance the packages are shown with the cans projecting beyond the open ends of the carton.

The delivery conveyor 13 is illustrated as being of the flat plate type, usually employed in beverage packing plants, and may be driven by a chain and sprocket 20, 21, as shown in FIG. 1. This delivery conveyor is preferably supported on frame members 10a and 11a independent of the frame members 10, 11 and 12.

Figure 2:
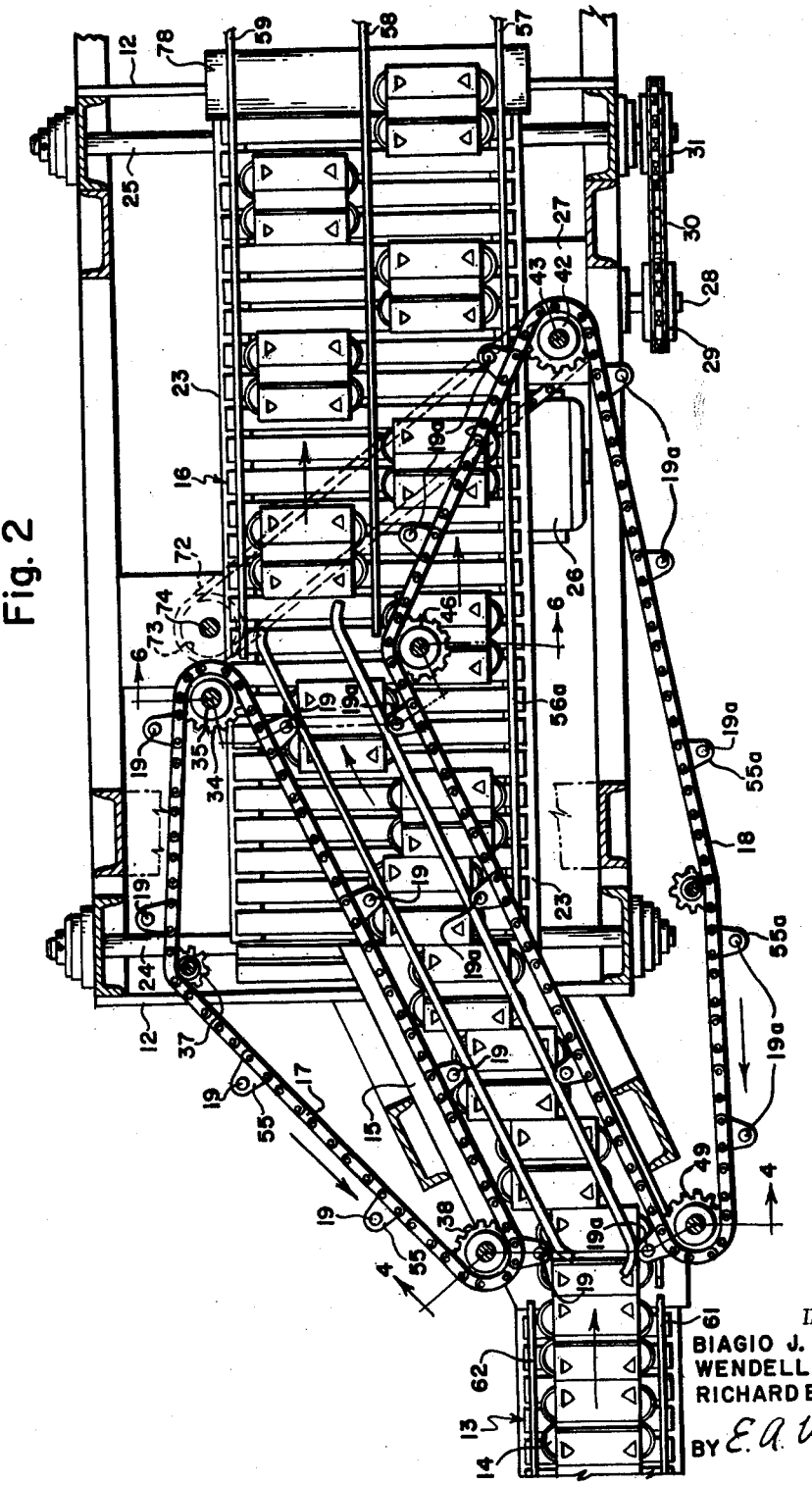
FIG. 2 is a plan view.

The receiving conveyor 16, as best seen in FIG. 2, is of the flat plate type carried horizontally along longitudinal supports 23, 23 secured to the base frame. The plates of the conveyor are connected by suitable linkage which passes over sprockets at each end of the frame, supported on shafts 24 and 25. Shaft 25 is driven from a motor 26 through suitable reduction gearing in gear box 27 to drive a shaft 28 carrying sprocket 29 over which a chain 30 passes, which also passes over sprocket 31 on the shaft 25.

Conveyor 16 may be of any desired width, but preferably has a width sufficient to carry two parallel rows of packages. The dead plate 15 is suitably secured on the base frame at the level of the two conveyors 13 and 16 so that packages may be readily transferred between the conveyors by sliding them over the plate.

For the purpose of moving the packages over the plate 15 and onto the conveyor 16 the conveyor sprocket chains 17 and 18 are supported in a plane above the conveyors and the plate 15. See FIGS. 1, 4, and 6. The conveyor chain 17 passes over a sprocket 34 on a vertically extending, driven stub shaft 35, journalled in a bearing 36. The chain then passes around an idler sprocket 37 journalled on the base frame, and a second idler sprocket 38 journalled at 39 on a bracket 40, located adjacent the discharge end of the delivery conveyor 13.

The conveyor chain 18 passes over a sprocket 42 on a vertically extending, driven shaft 43, journalled in bearings 44 and 45 on the base frame. Chain 18 also passes over an idler sprocket 46 on a stub shaft 47 journalled in a bearing 48, and over another idler sprocket 49 on a vertically extending stub shaft 50, journalled in bearing 51 carried on a bracket 52 and located opposite the sprocket 38 adjacent the discharge end of the delivery conveyor 13.

The location of the sprockets for chains 17 and 18 is such that the chains extend parallel to each other between the sprockets 34 and 38 for chain 17 and the sprockets 46 and 49 for chain 18. See FIG. 2. The parallel portions of the sprocket chains extend from the discharge end of the delivery conveyor 13, over dead plate 15 and at an oblique angle over the receiving conveyor 16.

In order to convey packages in the desired path from the delivery conveyor to the receiving conveyor the pins 19 and 19a on the conveyor chains 17 and 18 are arranged on the chains so that a package leaving the end of the delivery conveyor will be engaged at opposite sides simultaneously by a pair of such pins 19 and 19a. These pins are held in identically constructed brackets 55 and 55a, each constituting in effect a link in the sprocket chain.

At the discharge end of the two cooperating oblique sections of conveyor chains 17 and 18 the pins 19 and 19a are released substantially simultaneously from the package so that the packages so released will thereafter move in a straight line on conveyor 16.

An obliquely disposed guide bar section 56 (see FIGS. 1, 2 and 4) extends from a position adjacent the discharge point of the delivery conveyor to a position over the receiving conveyor to guide packages not engaged by the pins. The guide bar section 56 may be supplemented by an additional, connected section 56a, secured along the edge of receiving conveyor 16. Other guide bars 58 and 59 may be employed centrally and along the opposite edge of conveyor 16, and similar guide bars 61 and 62 may be arranged along the package path on delivery conveyor 13.

In order to hold the pins 19 and 19a positively in the desired straight line paths, pairs of guide bars 65, 65a and 66, 66a are arranged below the conveyor chains 17 and 18. Suitable anti-friction rollers 67 on pins 19, and 67a on pins 19a travel within the confines of these guides.

In order to drive the sprocket chains 17 and 18 the shaft 43, which carries sprocket 42, extends downward and is coupled to a stub shaft 70 projecting from the reduction gear box 27. The lower end of shaft 43 has a sprocket 71 secured thereon over which a sprocket chain 72 passes. This chain extends beneath conveyor 16 to a sprocket 73 on a vertical shaft 74 journalled on the frame and extending parallel with stub shaft 35 on which the sprocket 34 for chain 17 is secured. See FIG. 1. The shaft 74 carries a spur gear 76 meshing with a similar gear 77 on the stub shaft 35. Through the gearing described it is apparent that shaft 35 will rotate oppositely to shaft 43 for sprocket chain 18, whereby the parallel portions of the chains 17 and 18 will move in the same direction and at the same speed.

The various driving gears are so selected that the parallel portions of the chains 17 and 18 will have a forward component of travel substantially equal to the travel of the conveyor 16. Likewise the forward component of travel of the portion of chain 18 between sprockets 46 and 42 is substantially the same as the speed of conveyor 16. The driving means for conveyor 13 preferably operates this conveyor at a speed somewhat in excess of the chains 17 and 18 so that the packages will accumulate on conveyor 13 in abutted relation. The flat plate conveyor will thus slip slightly beneath the abutted packages and constantly urge them forwardly.

The distance between the discharge end of the delivery conveyor and the end of the receiving conveyor may be varied, in which case the dead plate 15 will be correspondingly lengthened or shortened. It will require only a relatively few abutted packages on the discharge end of conveyor 13 to push the leading package onto the dead plate where it will be in a position to be engaged by the pins 19, 19a, on chains 17 and 18.

Reviewing the operation, as soon as a supply of abutted packages is delivered to conveyor 13 the drive for the conveyor 16 and sprocket chains 17 and 18 may be started, and the operator will see that the leading package will be engaged between opposite pins 19 and 19a. The spacing of the pins on the conveyor chains is such that every other package will be engaged. As the two chains move at uniform speed the packages will remain in parallelism.

The non-engaged packages will move obliquely across the dead plate and onto the receiving end of the conveyor 16 in the same path as the engaged packages due to the fact that the non-engaged packages will move in contact with the guide bar 56. As soon as the non-engaged packages clear the end of the oblique section of the guide and reach the straight section 56a, these packages will tend to move straight ahead as shown in FIG. 2. The engaged packages will continue in their oblique movement until they are released by the pins 19 and 19a, as the chains carrying such pins move along the sprockets 34 and 46. Thus two rows of packages will be formed and the individual packages in each row will be spaced apart a distance equal to the package dimension.

Figure 6:
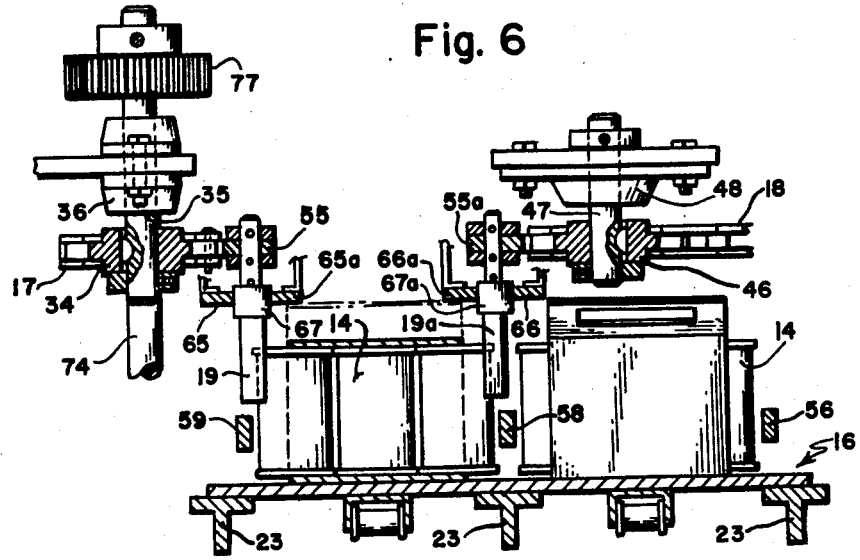
FIG. 6 is a vertical sectional view taken substantially along line 6—6 of FIG. 2.
Figure 7:
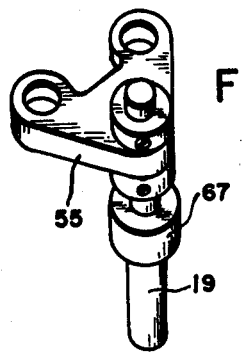
FIG. 7 is a detail view of one of the package engaging pin elements.
Figure 3:
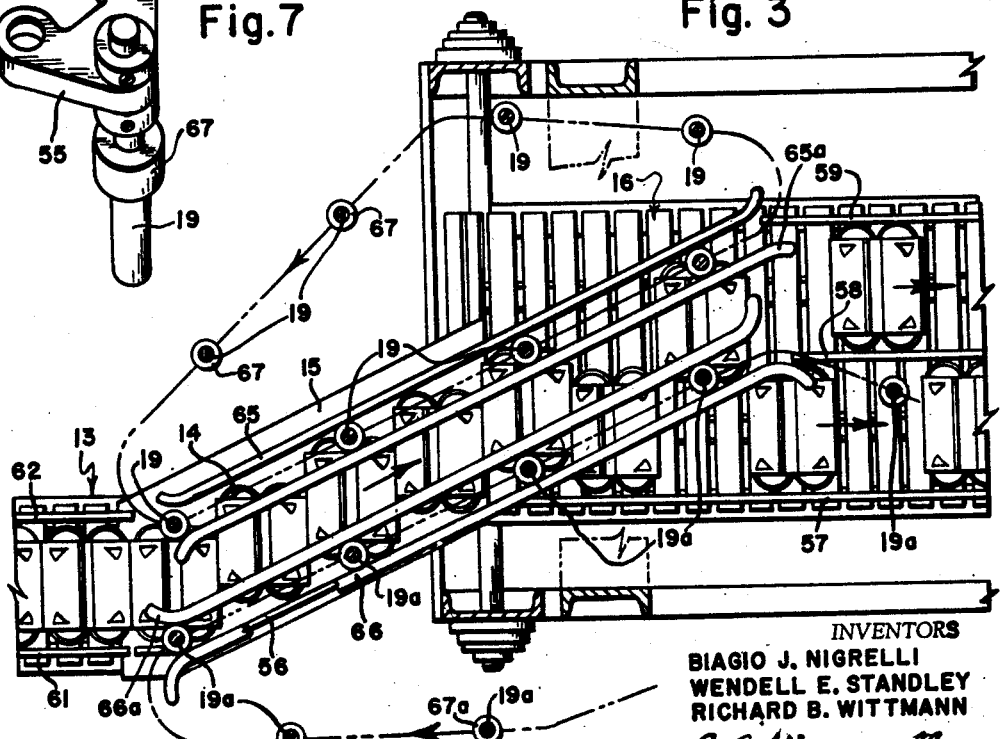
FIG. 3 is a horizontal sectional view, taken along line 3—3 of FIG. 1.

It is to be noted that the pins 19a on chain 18 must cross the path of the non-engaged packages, but there will be no interference for the reason that the pins will move within the spaces between the packages in this row. It is also to be noted that the packages may pass readily beneath the end of the stub shaft 47 and its sprocket 46 as shown in FIG. 6.

While the conveyor chains 17 and 18 are described as spaced above the conveyors, it is to be understood that this is for convenience of disclosure and that the relations of the parts with respect to a vertical direction may be changed without affecting the principles of the invention. Also, the conveying mechanism involving the use of the projecting pins on the conveyors 17 and 18 have utility when used with a moving supporting surface as provided by conveyor 16, or a non-moving surface as provided by the dead plate 15.

The conveyor 16 may be conveniently arranged to deliver the two rows of packages onto separate conveyors as found desirable. As shown in FIG. 2 the packages may move onto an inclined plate 78 where they can be further conveyed as desired.

The mechanism is not limited to the handling of packages of the particular shape illustrated and elongated packages may be conveyed transversely of the conveyor as shown or may be conveyed in a lengthwise direction without departing from the invention.

While the present description sets forth a preferred embodiment of the invention, numerous changes, other than indicated above, may be made in the mechanism as disclosed without departing from the spirit of the invention, and it is therefore desired that the present embodiment be considered in all respects as illustrative and not restrictive, reference being had to the appended claims rather than to the foregoing description to indicate the scope of the invention.

We claim:

1. In a conveying mechanism for converting a single row of rectangular shaped articles of uniform size to two rows, the combination of a delivery conveyor section on which such articles are advanced in single file, a receiving conveyor section for accommodating two parallel rows of such articles, a pair of cooperating conveyor members spaced above the delivery and receiving conveyor sections, such conveyor members having sections disposed in parallel relation to each other, such parallel sections extending at an oblique angle to the travel of the receiving conveyor section to divert conveyed articles laterally along an oblique path as they are advanced, said conveyor members each having article engaging elements arranged in opposed pairs to engage respectively the opposite lateral surface portions of selected articles conveyed in single file on the delivery conveyor section, article guide means disposed in spaced relation to the surface of the delivery and receiving conveyor sections, a portion of such guide extending at an oblique angle to the travel of the receiving conveyor and in parallelism with the path of the article engaging elements, whereby such guide will divert into an oblique path the articles not engaged by the article engaging elements, such obliquely disposed guide means terminating beyond the receiving end of the receiving conveyor section, whereby non-engaged articles may travel on the receiving conveyor beyond the guide in a path aligned with the normal path of such conveyor, the conveying members carrying the article engaging elements extending in their oblique path beyond the end of the guide means a sufficient distance to bring the engaged articles into a position spaced laterally from the final path of travel of the non-engaged articles, and means for releasing the engaging elements from the articles, whereby such articles may thereafter move on the receiving conveyor in parallelism with the row of non-engaged articles.

2. In a conveying mechanism for converting a single row of can packages of uniform size to two rows, the can packages being of the open-end type containing two rows of cans, the combination of a delivery conveyor section on which the packages are advanced in single file with their open ends disposed laterally of the path of travel, a receiving conveyor section for two parallel rows of packages, a pair of cooperating conveyor members spaced above the delivery and receiving conveyor sections, such conveyor members having sections disposed parallel to each other, such parallel sections extending at an oblique angle to the receiving conveyor to divert conveyed packages laterally along an oblique path as they are advanced, said conveyor members each having package engaging elements arranged in pairs to engage respectively within the bight between end cans at the ends of the packages conveyed in single file on the delivery conveyor, guide means for packages on the delivery and receiving conveyor sections, a portion of such guide means extending at an oblique angle to the travel of the receiving conveyor and in parallelism with the path of the package engaging elements, whereby such guide means will divert into an oblique path the packages not engaged by the package engaging elements, such obliquely disposed guide means terminating adjacent the receiving end of the receiving conveyor, whereby non-engaged packages may travel on the receiving conveyor beyond the guide in a path aligned with the normal path of such conveyor, the conveying members carrying the package engaging elements extending in their oblique path beyond the end of the guide means a sufficient distance to bring the engaged packages into a position spaced laterally from the final path of travel of the non-engaged packages, and means for releasing the engaging elements from the packages, whereby they may thereafter move on the receiving conveyor in parallelism with the row of non-engaged packages.

3. In a conveying mechanism for converting a single row of rectangular shaped articles of uniform size to two rows, the combination of a delivery conveyor section on which such articles are advanced in single file, a receiving conveyor section for two side-by-side rows of such articles, a pair of cooperating conveyor members disposed above the first mentioned sections, such conveyor members having sections disposed in parallel relation to each other, the parallel sections extending at an oblique angle to the travel of the receiving conveyor section to divert conveyed articles laterally along an oblique path as they are advanced, said conveyor members each having downwardly extending article engaging elements arranged in pairs to engage respectively the opposite lateral surface portions of every other article conveyed in single file on the delivery conveyor section, article guide means disposed along the delivery and receiving conveyor sections, a portion of the guide extending at an oblique angle to the path of the receiving conveyor and in parallelism with the paths of the article engaging elements, whereby such guide will divert into an oblique path the articles not engaged by the article engaging elements, such obliquely disposed guide means terminating beyond the receiving end of the receiving conveyor section, whereby non-engaged articles may travel on the receiving conveyor beyond the obliquely disposed guide means in a path aligned with the path of such conveyor, the conveying members carrying the article engaging elements extending in their oblique path beyond the end of the oblique guide means a sufficient distance to bring the engaged articles into a position spaced laterally from the final path of travel of the non-engaged articles, and means for releasing the engaging elements from the articles, whereby such articles may thereafter move on the receiving conveyor in parallelism with the row of non-engaged articles, the conveyor member with article engaging elements which is located on the side of the receiving conveyor on which the non-engaged articles are carried, being formed as an endless, chain-type conveyor, one segment of which passes from a point between the paths of the articles on the receiving conveyor, forwardly at an angle to a point outside the path of the non-engaged articles, whereby the downwardly extending article-engaging elements travel without interference in the spaces between the non-engaged articles as they advance on the receiving conveyor.

4. In a conveyor system for arranging articles of the type comprising packages containing two rows of generally cylindrical, upright cans, the ends of the rows being exposed at the ends of the packages, the combination of an elongated, primary conveyor along which two spaced rows of such packages may be advanced in a direction lengthwise thereof, a pair of endless, secondary conveyor members disposed in spaced relation over the primary conveyor, such secondary conveyor members having cooperating portions arranged equidistant from each other and extending across and forwardly of the primary conveyor at an acute angle to its longitudinal axis, the secondary conveyor members each having downwardly projecting elements arranged in opposed, cooperating pairs to engage in the bight between the exposed end cans at the respective opposite ends of the packages, each pair of downwardly projecting elements being disposed in a position extending substantially at right angles to the longitudinal axis of the primary conveyor to advance the packages obliquely in the direction of package travel on the primary conveyor while maintaining such packages with their can rows transverse to its longitudinal axis, and means for driving the secondary conveyor members at uniform speed.

5. In a conveyor system for arranging upstanding articles, the combination of an elongated, primary conveyor along which two spaced rows of articles may be advanced in a direction lengthwise thereof, a pair of endless, secondary conveyor members disposed in spaced relation over the primary conveyor, such secondary conveyor members having cooperating portions arranged equidistant from each other and extending across the primary conveyor at an acute angle to its longitudinal axis, the secondary conveyor members each having downwardly projecting elements arranged in opposed, cooperating pairs to engage and firmly hold the lateral surface portions of the individual articles, each pair of downwardly projecting elements being disposed in a position extending substantially at right angles to the longitudinal axis of the primary conveyor to advance the articles obliquely on the primary conveyor, and means for driving the secondary conveyor members at uniform speed.

References Cited in the file of this patent

UNITED STATES PATENTS

| | | |
|---|---|---|
| 805,736 | Lindgren | Nov. 28, 1905 |
| 1,806,805 | Knapp | May 26, 1931 |
| 2,366,569 | Sinden | Jan. 2, 1945 |
| 2,493,942 | Bingham | Jan. 10, 1950 |
| 2,499,694 | Stenger | Mar. 7, 1950 |
| 2,822,915 | Hampton | Feb. 11, 1958 |

FOREIGN PATENTS

| | | |
|---|---|---|
| 255,425 | Germany | Jan. 7, 1912 |